United States Patent [19]
Iron et al.

[11] Patent Number: 5,488,906
[45] Date of Patent: Feb. 6, 1996

[54] INTERNAL DRUM PRINTING PLATE PLOTTER

[75] Inventors: Gera Iron, Hod HaSharon; Zvi Krams, Ra'anana, both of Israel

[73] Assignee: Scitex Corporation Ltd., Herzlia B, Israel

[21] Appl. No.: 88,971

[22] Filed: Jul. 8, 1993

[30] Foreign Application Priority Data

Jul. 5, 1993 [IL] Israel ......................................... 106243

[51] Int. Cl.⁶ ..................................................... B41L 47/14
[52] U.S. Cl. ............................................. 101/477; 346/138
[58] Field of Search ................................... 101/477, 415.1, 101/481, 483, 485, 401.1, 389.1, 463.1, 471; 346/132, 134, 138, 76 L, 160, 75; 318/632; 400/88, 634, 642; 226/198

[56] References Cited

U.S. PATENT DOCUMENTS

| | | | |
|---|---|---|---|
| 3,984,747 | 10/1976 | Gerber et al. | 318/632 |
| 4,293,864 | 10/1981 | Scott | 346/76 L |
| 4,458,254 | 7/1984 | Gerber | 346/134 |
| 4,591,281 | 5/1986 | Howard et al. | 400/126 |
| 4,595,957 | 6/1986 | Holthusen | 358/290 |
| 4,684,228 | 8/1987 | Holthusen . | |
| 4,816,923 | 3/1989 | Saotome . | |
| 4,853,709 | 8/1989 | Stein et al. | 346/108 |
| 5,255,607 | 10/1993 | Nishiyama et al. | 101/481 |

FOREIGN PATENT DOCUMENTS

| | | |
|---|---|---|
| 20126469 | 11/1984 | European Pat. Off. . |
| 20264341 | 4/1988 | European Pat. Off. . |
| 4216055 | 8/1992 | Japan ............ 400/88 |
| 2038502 | 7/1980 | United Kingdom . |
| 2197964 | 6/1988 | United Kingdom . |
| WO92/14609 | 9/1992 | WIPO . |

OTHER PUBLICATIONS

"A Laser Imaging System for Platemaking & Facsimile" Proc. Soc. Photo–Opt. Instrum. Eng. (USA), /SPIE vol. 223 Laser Scanning & Recording For Graphic Arts and Publications (1980) 6 pages.

*Primary Examiner*—Eugene H. Eickholt
*Attorney, Agent, or Firm*—Skjerven, Morrill, MacPherson, Franklin & Friel

[57] ABSTRACT

An internal drum printing plate plotter is disclosed. The plotter provides a smooth path for a printing plate from an input location to a plotting location to an output location. The plotter includes a partially cylindrical drum and a loading tray associated with the drum at one end thereof. The drum covers at least 180 degrees of curvature and has an internal surface and the loading tray and the internal surface define the smooth path.

16 Claims, 9 Drawing Sheets

INTERNAL DRUM PRINTING PLATE PLOTTER

FIELD OF THE INVENTION

The present invention relates to plotting directly onto press plates generally and to doing so on an internal drum type plotter in particular.

BACKGROUND OF THE INVENTION

In the printing world, artwork is typically first plotted onto a film in an imagesetter or plotter. There are many types of imagesetters, three of the common ones are flat bed, external drum and internal drum imagesetters. A flat bed imagesetter scans film which has been placed onto a flat surface. External and internal drum imagesetters scan film which has been placed on the external and internal surface, respectively, of a cylindrical drum.

After plotting in an imagesetter, the artwork is transferred to a printing plate typically via a contact process. The printing plate is later to be placed on a printing press which prints the artwork onto pieces of paper or other permanent medium.

The contact process typically involves illuminating the printing plate which is placed the film, with a light bulb. New types of printing plates, such as the N90 manufactured by Hoechst AG of Germany, have recently been developed. These printing plates are typically formed of a metal or polyester sheet onto which is placed a light sensitive emulsion which is sensitive to scanned laser light. The artwork can be directly scanned onto these new printing plates, thereby potentially eliminating the need for the step of plotting on film.

However, the plotters which plot the artwork onto films cannot directly be utilized for plotting on the new printing plates for two main reasons: 1) the printing plates are less sensitive to laser light than film is and 2) the metal printing plates are not as flexible as the film.

The issue of sensitivity to laser light is typically solved by utilizing a stronger laser source. This entails also changing the associated optics to those which perform the same function but on the stronger laser beam.

The issue of rigidity is more difficult to solve. For a flat bed plotter, such as the Raystar CTP manufactured by Scitex Corporation Ltd. the assignees of the present invention, there is no problem since the printing plate is laid flat. However, flat bed plotters, for both films and printing plates, utilize a tremendous amount of floor space. External and internal drum plotters utilize less floor space and internal drum plotters provide the fastest scanning speed. Thus, an internal drum printing plate plotter has many advantages.

Reference is now made to FIG. 1 which illustrates a cross-section of a typical internal drum plotter for film. The unexposed film 10 is stored in an input cassette 12 and the exposed film 10' is stored in an output or takeup cassette 14. Between the two is the drum 16 against whose inner surface the film 10" to be exposed is laid, sometimes with the help of a vacuum system (not shown).

As shown, the film 10 follows a very curved path which is convex when entering and exiting the drum 16 (see reference numerals 18) and concave within the drum 16. Such a path is not possible for a printing plate; due to the rigidity of the plate, it cannot make such tight turns without becoming creased.

SUMMARY OF THE PRESENT INVENTION

It is therefore an object of the present invention to provide an internal drum plotter or imagesetter for printing plates.

There is therefore provided, in accordance with a preferred embodiment of the present invention, the internal drum plotter includes a partially cylindrical drum, having at least 180 degrees of curvature and having an internal surface and a loading tray associated with the drum at one end thereof. The loading tray and the internal surface define a smooth path at least for loading the printing plate into the drum.

Additionally, in accordance with the present invention, the loading tray can be either curved or partially flat. The tray typically has plate guides along the edges of the drum and the loading tray which guide the printing plate along the smooth path.

Moreover, in accordance with a preferred embodiment of the present invention, the plotter includes a loading and unloading system. In one embodiment the system preferably includes rollers for moving the printing plate along the smooth path.

In another embodiment, the system preferably includes a pivot and an actuator for rotating the loading tray from a loading position abutting the drum to an unloading position away from the drum. The unloading position defines a gap between the loading tray and the drum through which the printing plate can move.

Additionally, in accordance with a preferred embodiment of the present invention, the present invention includes a system, operative at least during plotting, for securing the printing plate against an inner surface of the drum. The system for securing can be a vacuum system. Alternatively, it can utilize the rollers for beding the printing plate such that it is secured against the inner surface of the drum.

Furthermore, in accordance with a preferred embodiment of the present invention, the present invention includes a registration system.

In one embodiment, the registration system preferably includes a registration stop which defines a plotting position of a forward edge of the printing plate and edge detectors for defining a plotting position of a side edge of the printing plate. When the printing plate is in the plotting position, it completes an electrical circuit comprising the registration stop and the edge detectors.

In a second embodiment, the registration system preferably includes at least one punch.

There is also provided, in accordance with a preferred embodiment of the present invention, an internal drum printing plate plotter having a smooth path for a printing plate from an input location to a plotting location to an output location.

Additionally, the input location and the output location can be equivalent or different.

Finally, there is provided, in accordance with a preferred embodiment of the present invention, a method for entering a printing plate into an internal drum printing plate plotter, the method including the step of sliding a printing plate along a smooth path from an input location to a plotting location to an output location.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

Figure 2:
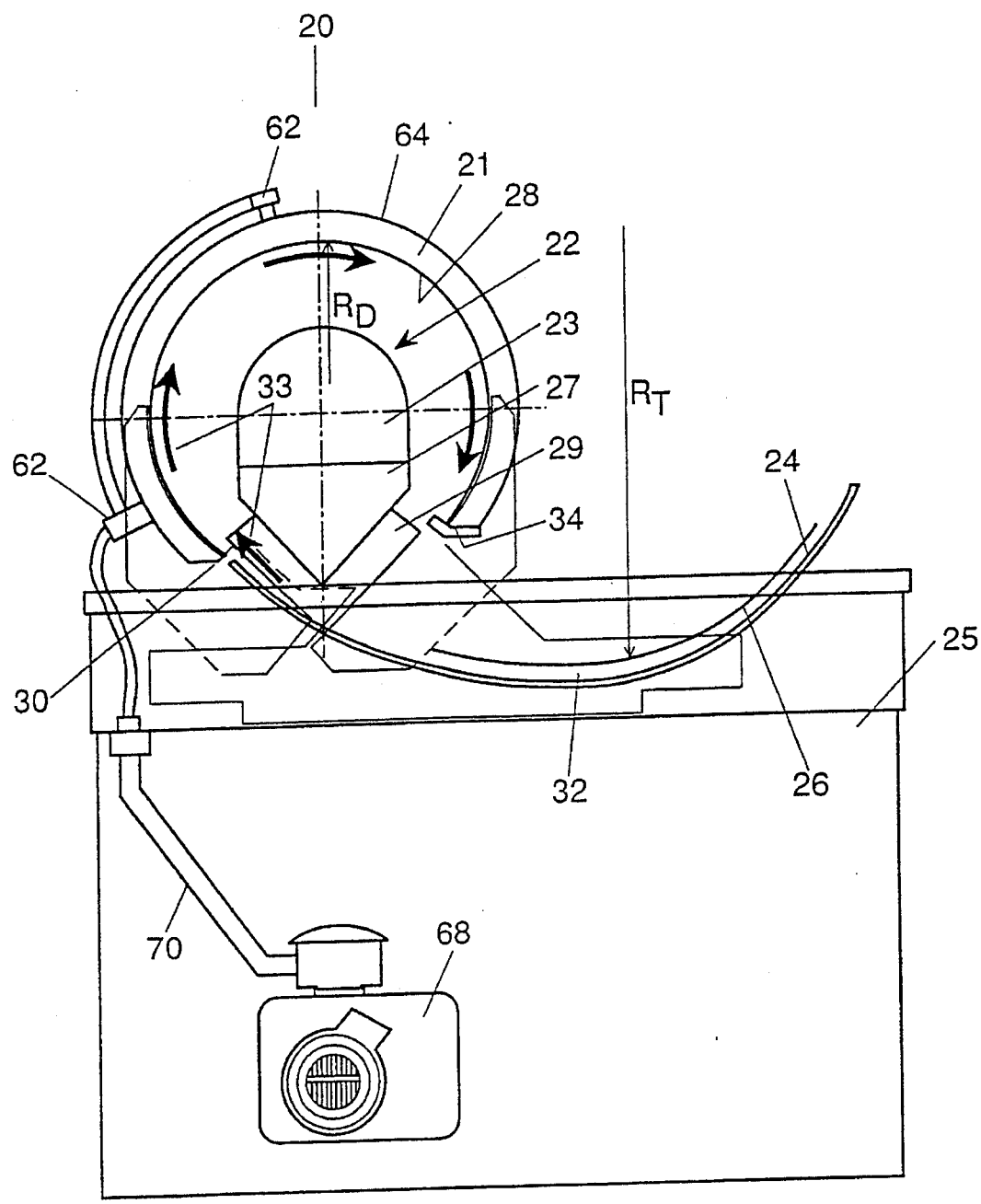
FIG. 2 is a schematic side view illustration of an internal drum printing plate plotter constructed and operative in accordance with a first embodiment of the present invention.
Figure 3A:
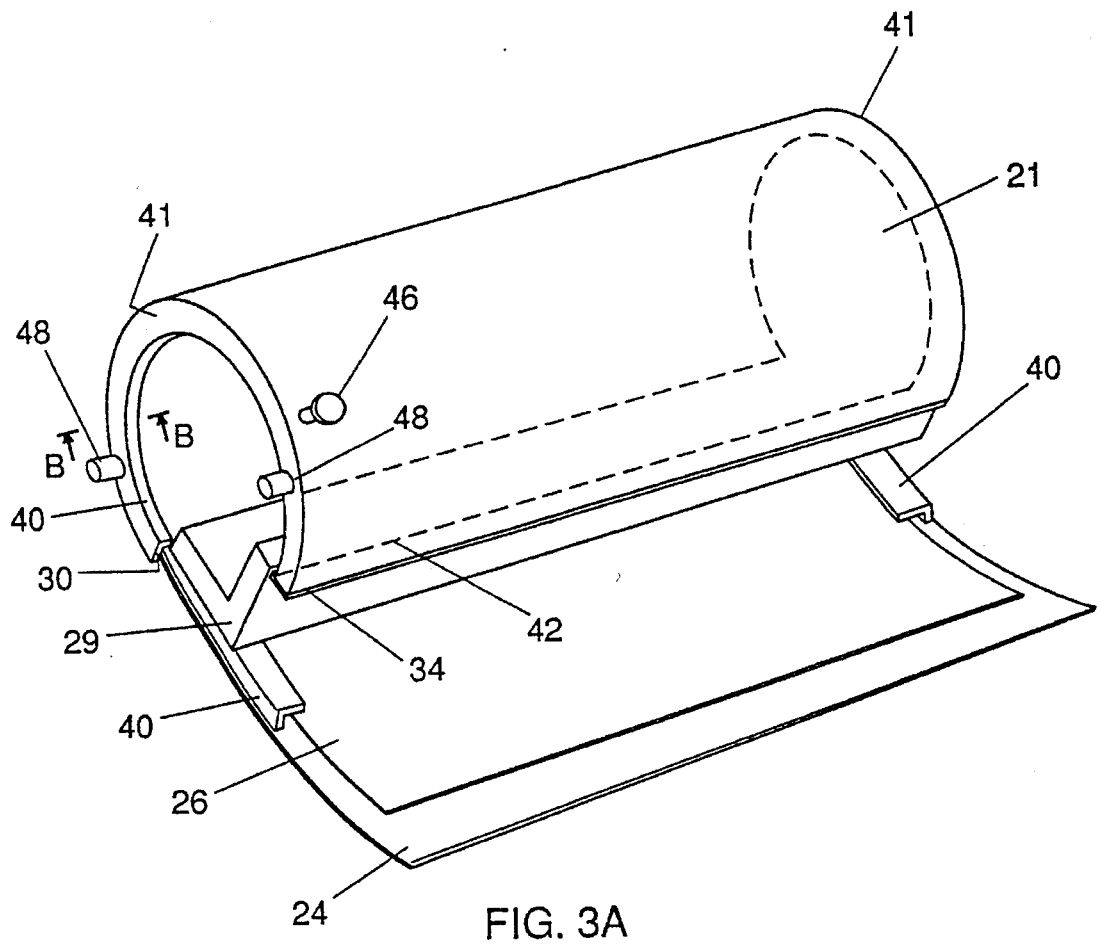
FIG. 3A is a schematic isometric illustration of a drum and loading tray portion of the plotter of FIG. 2.
Figure 3B:
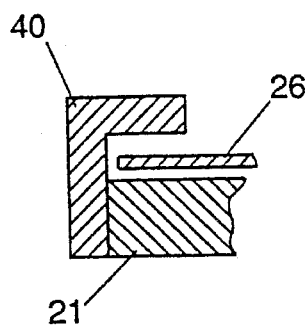
FIG. 3B is a cross-sectional view along lines B—B of FIG. 3A illustrating the shape of a printing plate guide.

Reference is now made to FIGS. 2, 3A and 3B which illustrate a first embodiment of a plotter 20, constructed and operative in accordance with the principles of the present invention. The plotter 20 provides a smooth loading and unloading path for the printing plate and thereby avoids permanently creasing the plate. In the present application, the term "smooth" indicates that changes in the direction of movement are gradual.

FIG. 2 is a side view illustration of the present invention, FIG. 3A is an isometric view of a drum portion of the plotter 20 and FIG. 3B is a cross-sectional view of the drum along line B—B of FIG. 3A.

The plotter 20 typically comprises a partially cylindrical drum 21, a translating optical system 22 and a loading tray 24 all located within a housing 25. The optical system 22 can be any type of internal drum optics modified to operate with the stronger laser source required to plot on a printing plate 26. For example, it typically comprises a set of optics 23, a carriage 27 on which the set of optics 23 are mounted and which translates, and a carriage guide 29 which guides the motion of the carriage 27.

As illustrated by arrows 33, the loading tray 24 smoothly guides the printing plate 26 towards an inner surface 28 of drum 21. When the plate 26 is in a plotting position, the optical system 22 plots the desired artwork onto the plate 26 in a standard, internal drum manner.

The loading tray 24 is typically attached to an entrance end 30 of drum 21 such that an inner surface 32 of tray 24 and the inner surface 28 of drum 21 provide a smooth path for the printing plate 26. In the embodiment of FIG. 2, the loading tray 24 is curved, with a radius $R_T$ greater than a radius $R_D$ of drum 21. Furthermore, the tray 24 typically extends outside of the drum 21, thereby to provide a comfortable loading position for a user.

The drum 21 spans an arc of at least 180 degrees and more typically of 250–300 degrees, between entrance end 30 and a second end 34. The optical system 22 must be small enough to fit mostly within the drum 21 wherein the loading tray 24 typically extends under the carriage guide 29.

FIG. 3A illustrates the printing plate 26 sliding into the drum 21. Both the loading tray 24 and the drum 21 have side guides 40, shown in detail in FIG. 3B, for guiding the printing plate 26 along their respective inner surfaces 32 and 28. The guides 40 are located along side edges 41 of drum 21 and tray 24.

In order to enable the printing plate 26 to slide into a plotting position wherein a forward edge 42 of plate 26 approaches end 34, the guides 40 jut above the surfaces 32 and 28 enough to ensure a) that the printing plate 26 can slide smoothly and b) that when a vacuum is provided, described in more detail hereinbelow, the printing plate 26 can be sucked towards the inner surface 28.

It is noted that, in this embodiment, the printing plate 26 is typically slid into the drum 21 via a user.

Figure 1:
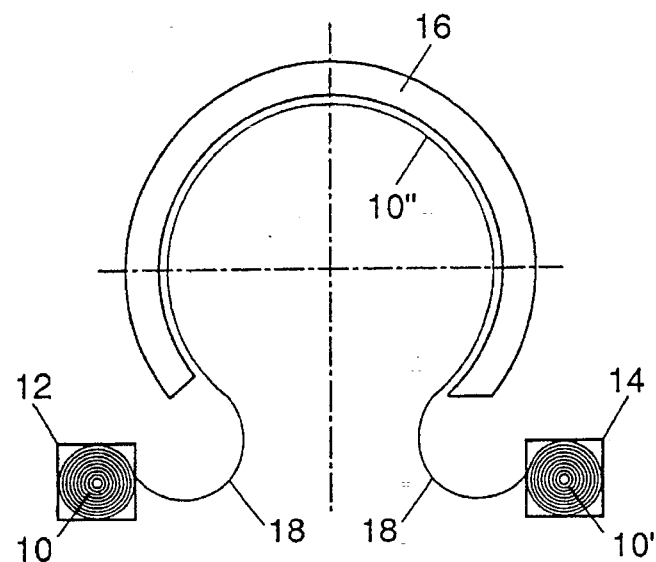
FIG. 1 is a schematic illustration of a prior art internal drum plotter.
Figure 5:
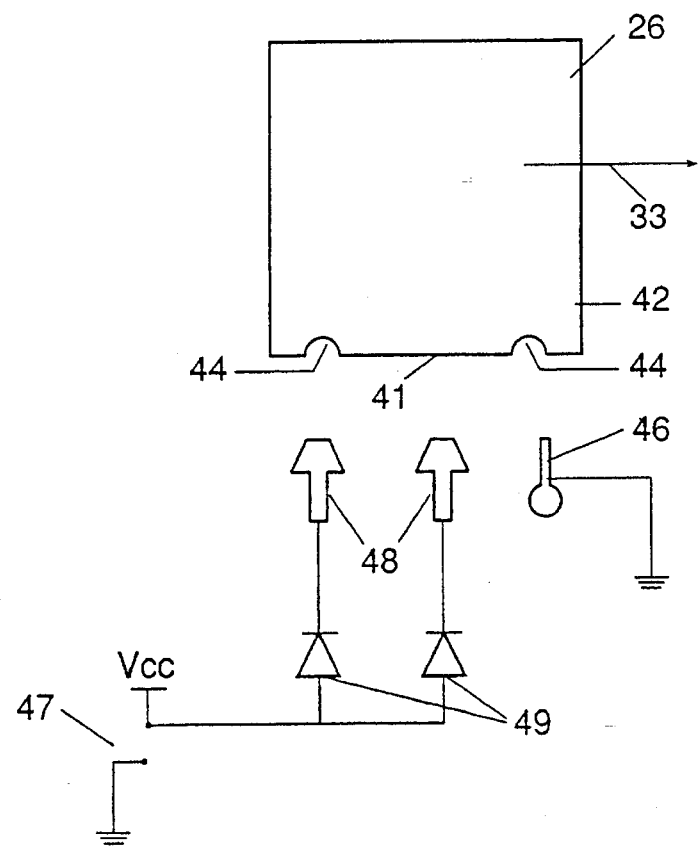
FIG. 5 is a circuit diagram illustration of a detection system forming part of the registration system of FIG. 4A.
Figure 4A:
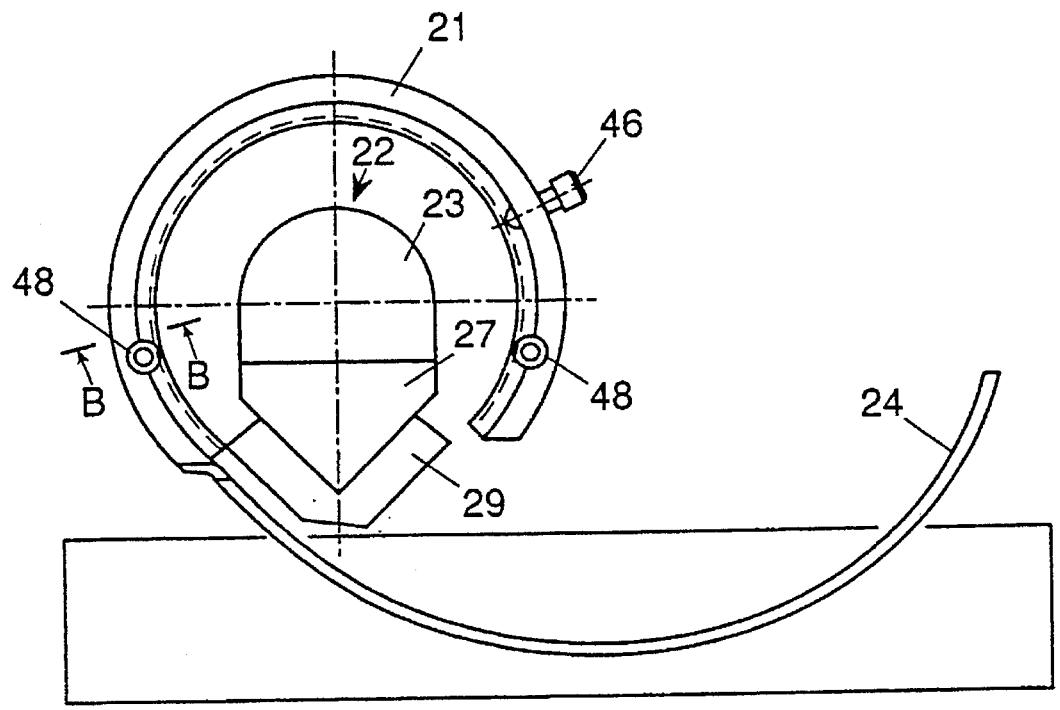
FIG. 4A is a simplified schematic cross-sectional view of the drum and loading tray portion of the plotter illustrating a first registration system.
Figure 4B:
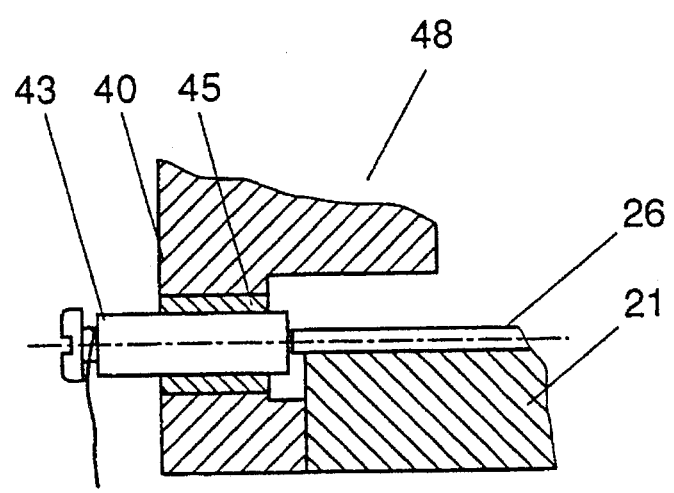
FIG. 4B is a cross-sectional view along lines B—B of FIG. 4A illustrating an edge detector forming part of the registration system of FIG. 4A.
Figure 6:
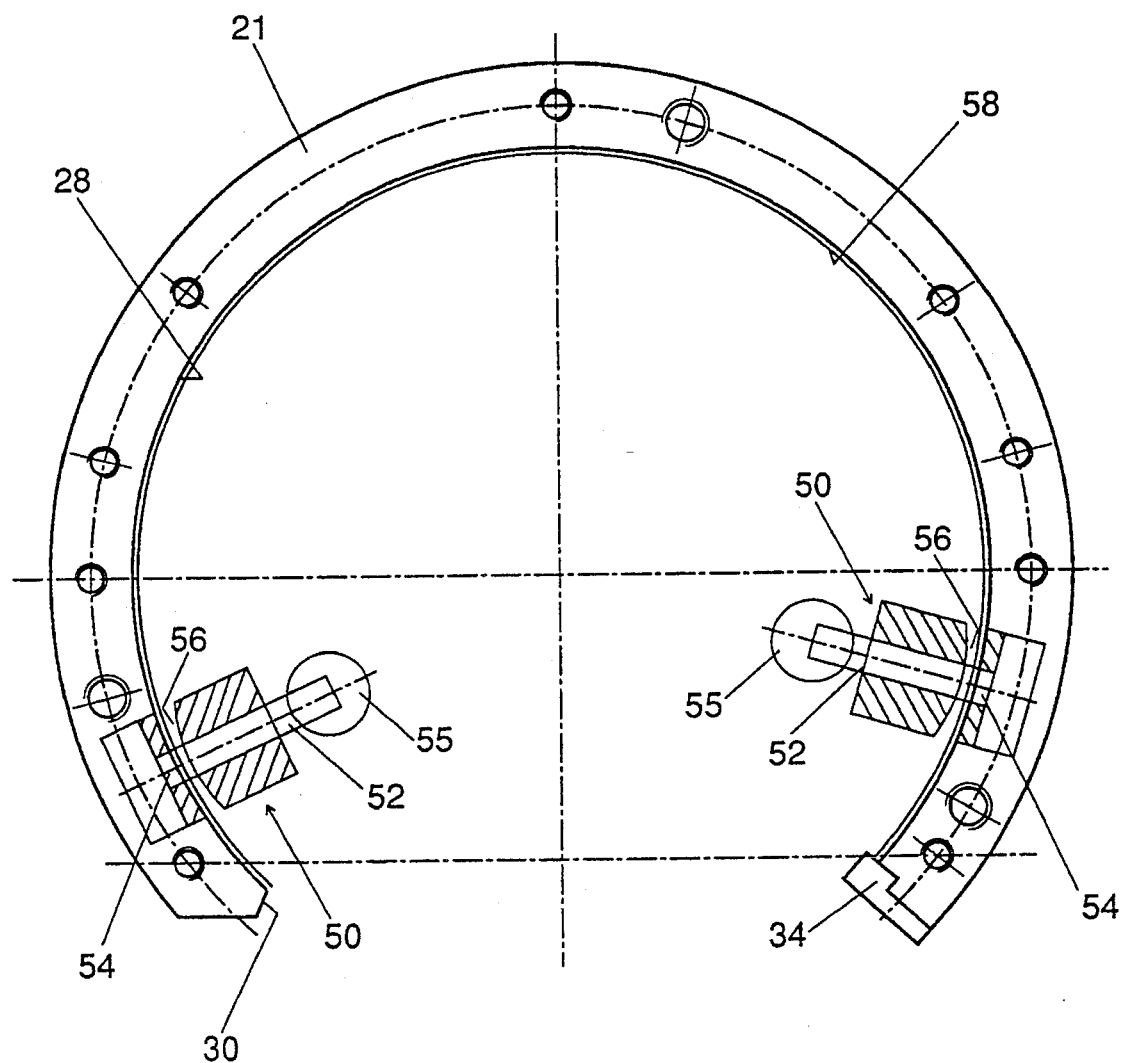
FIG. 6 is a schematic illustration of a portion of a drum having a second registration system.

Reference is now made to FIGS. 4A, 4B, 5 and 6 which illustrate two alternative systems, forming part of the plotter 20, for registering that the printing plate 26 has achieved a plotting position within the drum 21. This is particularly useful when plotting printing plates 26 for four color separations. A first embodiment of the system for registering is shown in FIGS. 4A, 4B and 5 and operates in conjunction with at least one registration hole 44 (two are shown in FIG. 5) such as are found at the side of all pre-punched printing plates. A second system is illustrated in FIG. 6 and comprises two punches 50 for punching registration holes before or after plotting of the artwork.

The first system comprises at least one stopper, such as a registration pin 46, operative to extend through hole 44 and two edge detectors 48. The registration pin 46 defines the plotting position of forward edge 42. The edge detectors 48 are located on one side of drum 21 and define the plotting position of one side edge 41 by detecting when edge 41 is against them.

As shown in FIG. 4B, each edge detector 48 typically comprises a conductive pin 43, typically of stainless steel, surrounded by an isolating material 45, typically of delarin or some other appropriate isolating plastic, at a pre-determined location within guides 40.

The edge detectors 48 electrically detect when the printing plate 26, which is typically metallic, is pressed against them. If both detectors 48 detect the printing plate 26, then the plate is properly aligned along a straight line.

FIG. 5 illustrates an example circuit diagram for the registration system, in conjunction with the plate 26. The registration pin 46 is formed of metal and is connected to ground. When it is within hole 44, it electrically connects the printing plate 26 to ground.

A battery 47 provides power to two light bulbs 49 each also connected to the detectors 48. When the printing plate 26 is not against the detectors 48, the circuit is in an open state and the light bulbs 49 are not lit. When the printing plate 26 is against one or both of the detectors 48 and the pin 46 is in place, the circuit is closed and one or both, respectively, of light bulbs 49 will be lit. The printing plate 26 is in position when both light bulbs 49 are lit.

It will be appreciated that any other detecting circuit can be utilized, including one which lights a single bulb when the printing plate 26 is in the proper position.

The second system for registering is illustrated in FIG. 6. It comprises two punches 50 located near ends 30 and 34 of drum 21. Each punch 50 comprises a punching piston 52 and a die 54, where the die 54 is located within drum 21, below its inner surface 28, and the punching piston 52 is located in the cavity of the drum 21. Each punching piston 52 is actuated by a motor 55. There is a space 56 between the piston 52 and the die 54 within which an un-punched printing plate, labeled 58, lies when it is in a plotting position.

When a suitable signal is received, the motors 55 move the punching pistons 52 toward the die 54, each punching a registration hole in the printing plate 58. The artwork is then plotted at known distances from the location of the registration holes.

Figure 7A:
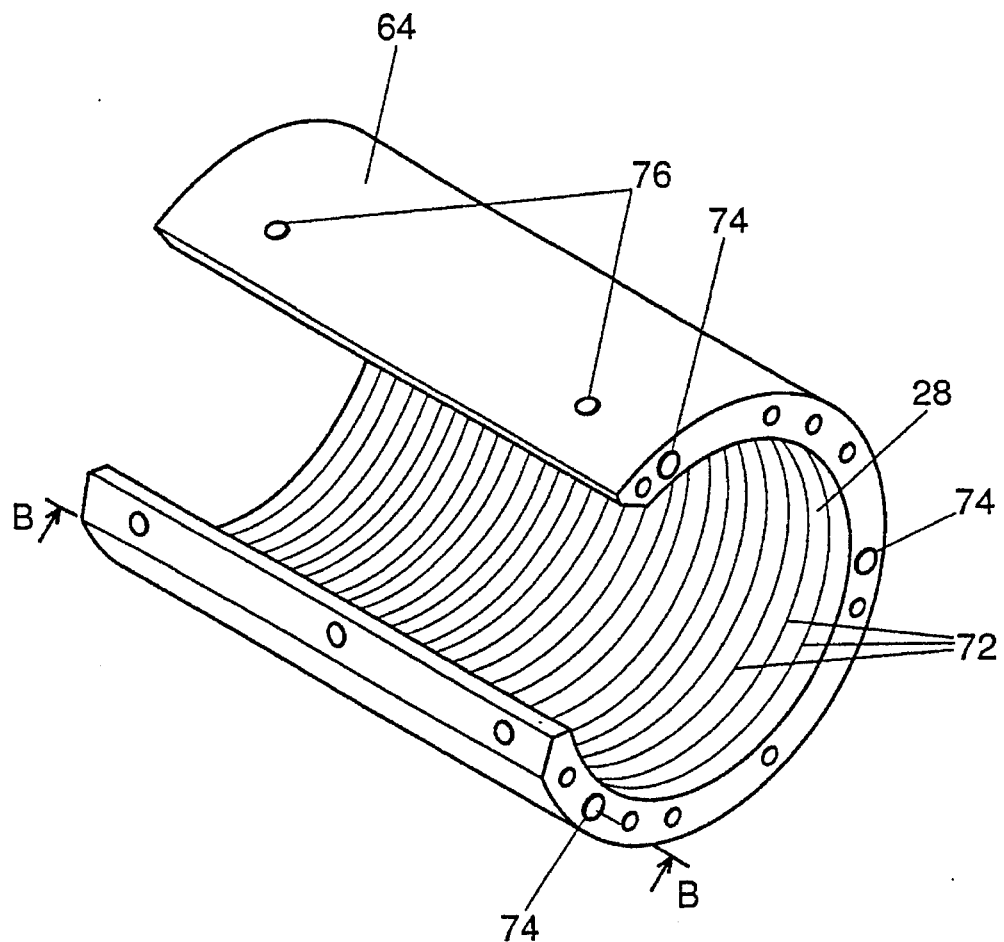
FIG. 7A is an isometric illustration of grooves on a drum forming part of a vacuum system.
Figure 7B:
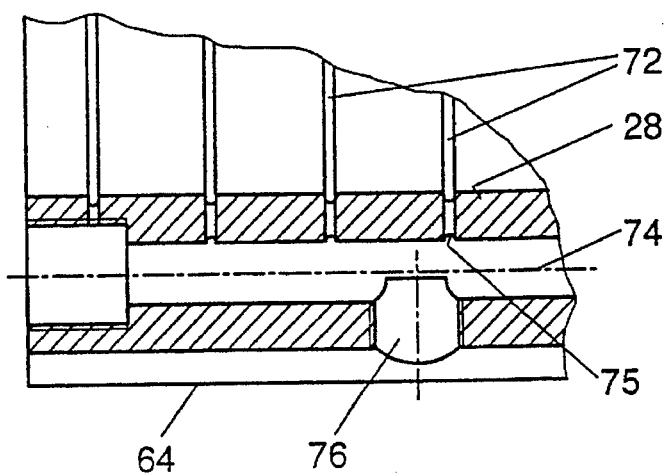
FIG. 7B is a cross-sectional view along lines B—B of FIG. 7A illustrating elements of the vacuum system of FIG. 7A.

Reference is now made to FIG. 2 and to FIGS. 7A and 7B which illustrate a system for securing the printing plate 26 or 58 (FIG. 6) (the reference numeral 26 will be used herein for the printing plate) to the inner surface 28 of drum 21, at least during plotting. In the embodiment of FIGS. 2, 7A and 7B, the system for securing comprises a vacuum system.

The vacuum system typically comprises a plurality of vacuum connectors 62 located on an outside surface 64 of drum 21, a vacuum pump 68 for producing the vacuum and a vacuum pipe 70 connecting the pump 68 to the vacuum connectors 62. As shown in FIG. 7A, on the inner surface 28 of the drum 21 are a plurality of circumferential grooves 72 each connected, as shown in FIG. 7B, via an axial hole 75 to a larger axial hole 74. Hole 74 in turn, is connected to a plurality of radial boreholes 76.

The vacuum connectors 62 are typically located over boreholes 76 which provide the vacuum from the vacuum connectors 62 to the grooves 72 on the inner surface 28 of drum 21.

After the vacuum is released, the printing plate 26 is typically unloaded. There are many methods of unloading, two of which are detailed hereinbelow with respect to FIGS. 2 and 8.

In the first embodiment (FIG. 2), the printing plate 26 is pulled in the opposite direction of arrows 33, typically via the user.

In the second embodiment (FIG. 8), the loading tray 24 is selectably abutted with the drum 21 and rotatable around a pivot 84. For this purpose, the plotter of the present invention additionally comprises an actuator 88, an unloading plate 90, and a guide extension 92 located below carriage guide 29.

During loading of a printing plate 26, the loading tray 24 abuts drum 21 in a first position 86, indicated by dotted lines. Loading tray 24 is held in first position 86 by actuator 88. During unloading of printing plate 26, actuator 88 rotates loading tray 24 away from drum 21 to a second position, indicated by solid lines. This causes a gap through which the printing plate 26 can be moved.

The user then pulls or pushes the printing plate 26 forward, in the direction of arrows 33, along guide extension 92 and through the now present gap towards unloading plate 90. Since the drum 21 covers more than 180 degrees, the unloading portion of the path, indicated by arrows 33', cross over the loading portion of the path, indicated by arrows 33". If desired, unloading plate 90 can be moved towards guide extension 92 prior to the unloading process.

Figure 9:
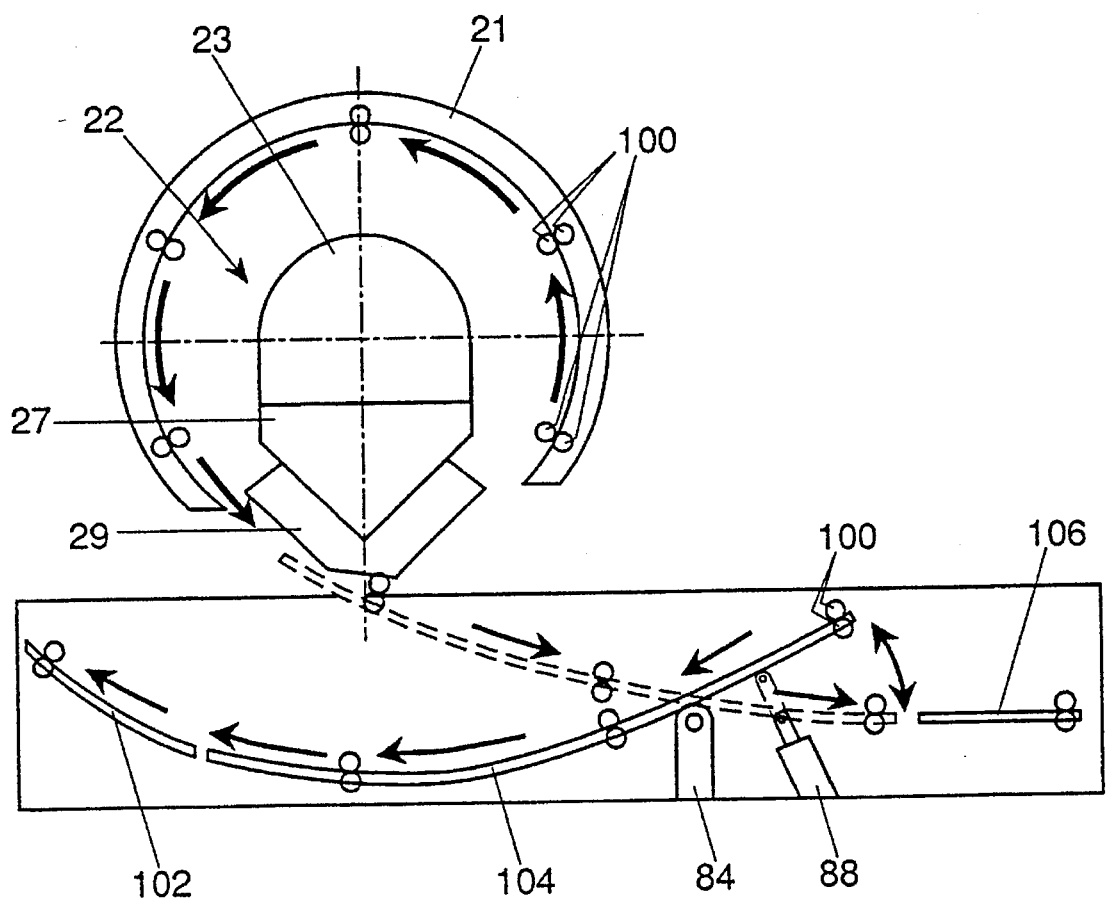
FIGS. 9 and 10 are schematic illustrations of third and fourth embodiments of the present invention providing an automatic loading and unloading capability.
Figure 10:
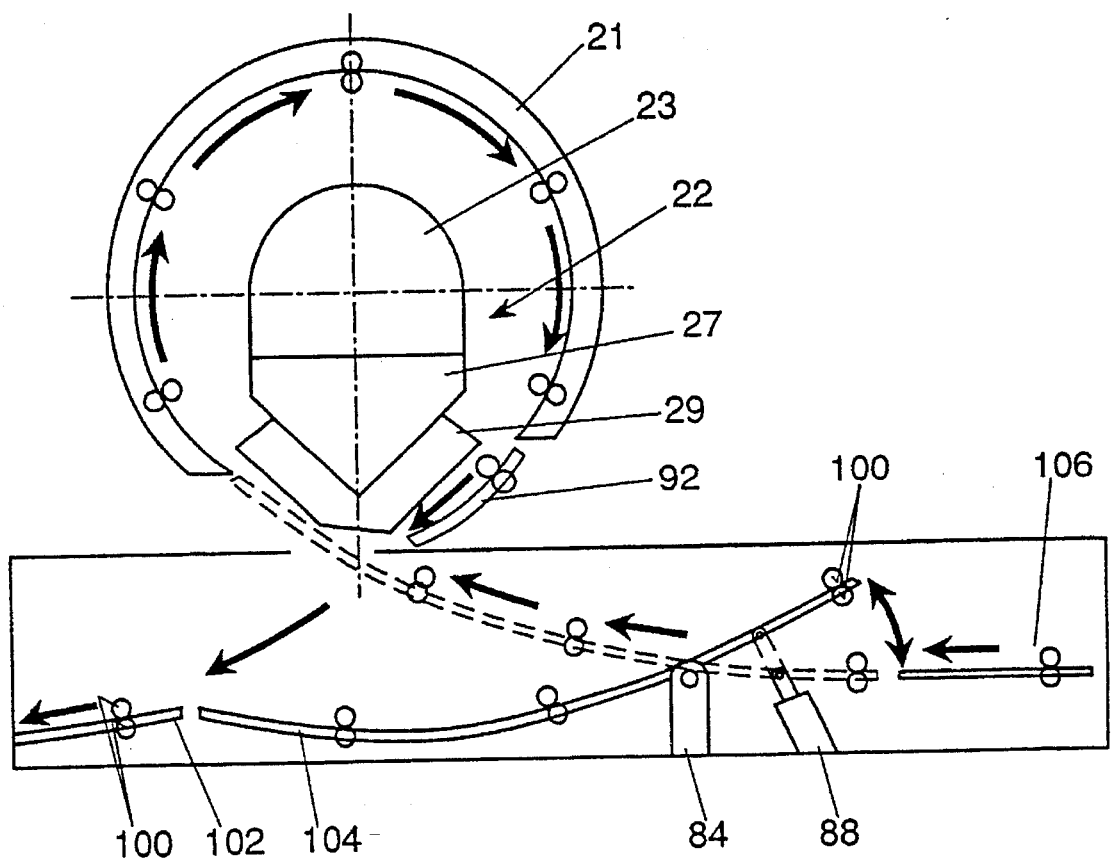

Reference is now made to FIGS. 9 and 10 which illustrate alternative embodiments of the present invention in which the printing plate 26 is automatically loaded and unloaded, respectively into and from the plotting position. FIGS. 9 and 10 are two examples of automated systems; other systems utilizing the principles of the present invention are included within the scope of the present invention.

Elements of the embodiments of FIGS. 9 and 10 which are similar to those of the previous Figs. have the same reference numerals.

In the embodiments of FIGS. 9 and 10, the loading and unloading is provided via a plurality of rollers 100 located along the loading and unloading paths. The rollers 100 can be any suitable type of motorized roller, such as rubber rollers, and are operative to push the printing plate 26 into and pull the printing plate 26 out of the plotting position.

In the embodiment shown in FIG. 9, the loading tray, labeled 104, is much less curved. In fact, at a loading end 106, the loading tray 104 is generally flat. As in previous embodiments, loading tray 104 selectively abuts drum 21 and is rotatable about pivot 84. During loading, illustrated with dotted lines, tray 104 abuts drum 21 and the rollers 100 rotate clockwise to push the printing plate 26 towards the plotting position.

After plotting, the rollers 100 rotate counter clockwise to pull the printing plate 26 backwards, towards an initial position wherein the printing plate 26 lies entirely on the loading tray 104. At that point, actuator 88 rotates the loading tray 104 to abut a plate removal platform 102. The rollers of the loading tray 104 then rotate clockwise to push the printing plate 26 towards platform 102.

Figure 8:
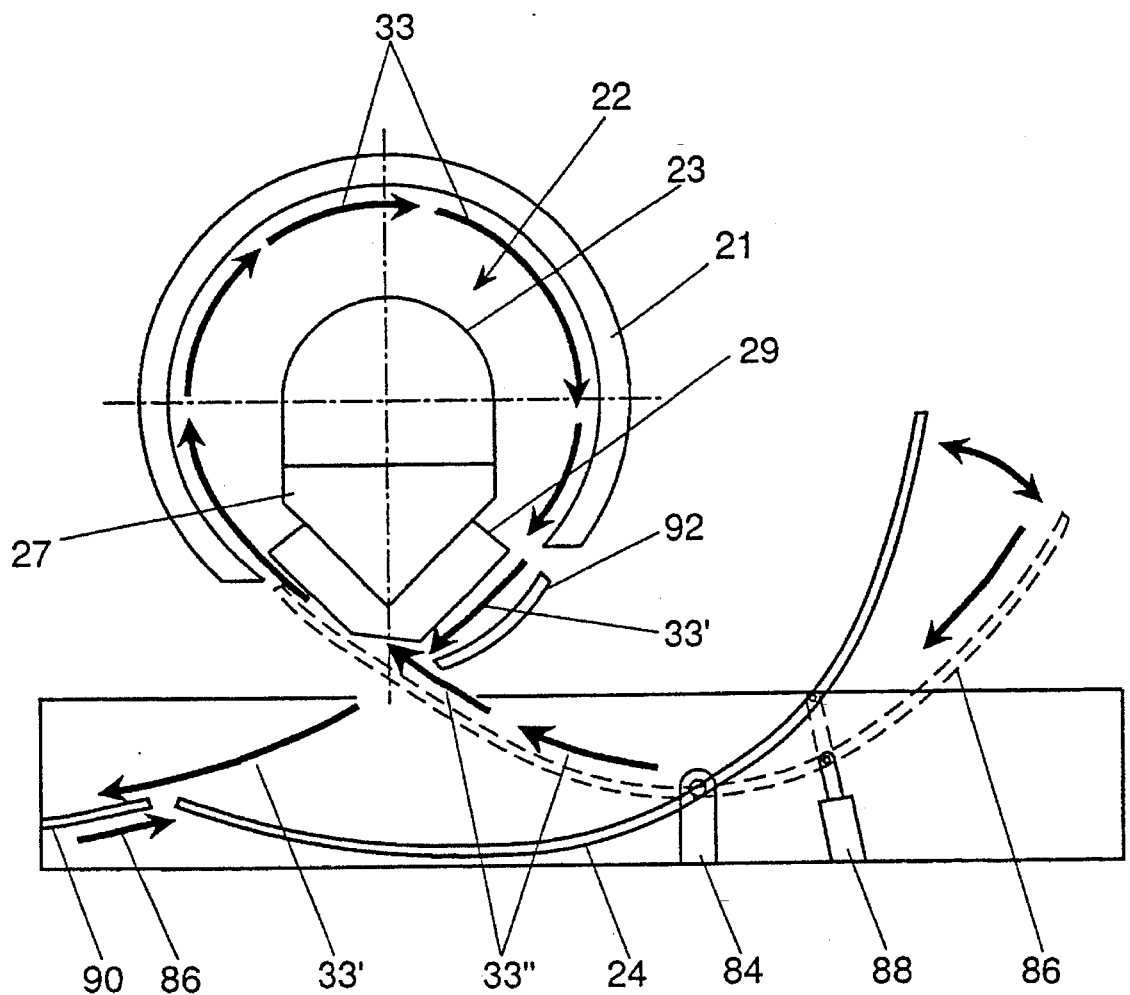
FIG. 8 is a schematic illustration of a second embodiment of the present invention having a different unloading method.

In the embodiment shown in FIG. 10, the rollers 100 always rotate clockwise, thereby causing the printing plate 26 always to move forward, as in the manual embodiment of FIG. 8. The operation of the loading tray 104 is as described hereinabove with respect to FIG. 8 and therefore, will not be described further.

The plotters of the embodiments of FIGS. 9 and 10 also include a system for securing the printing plate 26 to the inner surface 28 of the drum 21, as described hereinabove with respect to FIGS. 2, 7A and 7B, and a registration system such as the one described with respect to FIG. 6.

In addition, the rollers 100 can be utilized as part of the system for securing. If there is a stop at the plotting location and the rollers 100 continue to rotate after the plate 26 has reached the stop, the rollers 100 will cause the plate 26 to continue bending until the plate 26 is firmly against the inner surface 28.

It will be appreciated by persons skilled in the art that the present invention is not limited to what has been particularly shown and described hereinabove. Rather the scope of the present invention is defined by the claims which follow:

We claim:

1. An internal drum printing plate plotter for plotting on a printing plate, the plotter comprising:

a partially cylindrical drum, having at least 180 degrees of curvature and having an internal surface;

a loading tray associated with said drum at one end thereof;

wherein said loading tray and said internal surface define a continuous path at least for loading said printing plate into said drum.

2. A plotter according to claim 1 and wherein said loading tray is curved.

3. A plotter according to claim 1 and wherein said loading tray has at least a portion which is generally flat.

4. A plotter according to claim 1 and additionally comprising plate guides along edges of said drum and said loading tray for guiding said printing plate along said smooth path.

5. A plotter according to claim 1 and also comprising an loading and unloading system.

6. A plotter according to claim 5 and wherein said loading and unloading system comprises rollers for moving said printing plate along said smooth path.

7. A plotter according to claim 5 and wherein said loading and unloading system comprising a pivot and an actuator for rotating said loading tray from a loading position abutting said drum to an unloading position away from said drum.

8. A plotter according to claim 7 and wherein said unloading system defines a gap between said loading tray and said drum through which said printing plate can move during unloading.

9. A plotter according to claim 1 and also comprising a system, operative at least during plotting, for securing said printing plate against an inner surface of said drum.

10. A plotter according to claim 9 and wherein said system for securing is a vacuum system.

11. A plotter according to claims 6 and 9 and wherein said system for securing utilizes said rollers for bending said printing plate such that it is secured against said inner surface of said drum.

12. A plotter according to claim 1 and also comprising a registration system.

13. A plotter according to claim 12 and wherein said registration system comprises a registration stop which defines a plotting position of a forward edge of said printing plate and edge detectors for defining a plotting position of a side edge of said printing plate.

14. A plotter according to claim 13 and wherein said when said printing plate is in said plotting position, it completes an electrical circuit comprising said registration stop and said edge detectors.

15. A plotter according to claim 12 and wherein said registration system comprises at least one punch.

16. An internal drum printing plate plotter having a continuous path for a printing plate from an input location to a plotting location to an output location, wherein said input location and said output location are equivalent.

* * * * *